United States Patent
Ikeda et al.

(10) Patent No.: US 12,163,809 B2
(45) Date of Patent: Dec. 10, 2024

(54) REDUNDANT RESOLVER AND ELECTRIC POWER STEERING DEVICE EQUIPPED WITH REDUNDANT RESOLVER

(71) Applicant: Mitsubishi Electric Corporation, Tokyo (JP)

(72) Inventors: Hiroko Ikeda, Tokyo (JP); Shohei Fujikura, Tokyo (JP); Tatsuya Mori, Tokyo (JP); Kenji Ikeda, Tokyo (JP); Kenta Kubo, Tokyo (JP); Toshihiro Matsunaga, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 195 days.

(21) Appl. No.: 17/915,860

(22) PCT Filed: Apr. 9, 2020

(86) PCT No.: PCT/JP2020/015954
§ 371 (c)(1),
(2) Date: Sep. 29, 2022

(87) PCT Pub. No.: WO2021/205596
PCT Pub. Date: Oct. 14, 2021

(65) Prior Publication Data
US 2023/0125647 A1 Apr. 27, 2023

(51) Int. Cl.
*G01D 5/20* (2006.01)
*B62D 5/04* (2006.01)
(Continued)

(52) U.S. Cl.
CPC ......... *G01D 5/2046* (2013.01); *B62D 5/0481* (2013.01); *G01B 7/30* (2013.01);
(Continued)

(58) Field of Classification Search
CPC ...... G01D 5/2046; B62D 5/0481; G01B 7/30; H02K 1/16; H02K 1/24; H02K 3/28
See application file for complete search history.

(56) References Cited

U.S. PATENT DOCUMENTS

2005/0057245 A1 3/2005 Miya
2013/0060518 A1 3/2013 Nakazato
(Continued)

FOREIGN PATENT DOCUMENTS

JP 4147930 B2 7/2008
JP 2009-222435 A 10/2009
(Continued)

OTHER PUBLICATIONS

Extended European Search Report dated Apr. 11, 2023 in Application No. 20930079.7.
(Continued)

*Primary Examiner* — Jermele M Hollington
*Assistant Examiner* — Zannatul Ferdous
(74) *Attorney, Agent, or Firm* — Sughrue Mion, PLLC; Richard C. Turner

(57) ABSTRACT

A resolver body including a rotor having Nx (Nx is a natural number) salient poles, a stator facing the rotor and having Ns (Ns is an integer equal to or larger than 3) teeth arranged in a circumferential direction, and an excitation winding and two phases of output windings wound on each tooth; and an excitation circuit configured to apply voltage to the excitation winding. The excitation winding and the two phases of output windings wound on each of Nsm (Nsm is an integer equal to or larger than 2) teeth among the Ns teeth are set to be of a main system. The excitation winding and the two phases of output windings wound on each of Ns-Nsm teeth are set to be of a sub-system. The number Nsm of the teeth (Continued)

corresponding to the main system is larger than the number Ns-Nsm of the teeth corresponding to the sub-system.

16 Claims, 9 Drawing Sheets

(51) Int. Cl.
    *G01B 7/30*     (2006.01)
    *H02K 1/16*     (2006.01)
    *H02K 1/24*     (2006.01)
    *H02K 3/28*     (2006.01)

(52) U.S. Cl.
    CPC ................. *H02K 1/16* (2013.01); *H02K 1/24* (2013.01); *H02K 3/28* (2013.01)

(56) References Cited

U.S. PATENT DOCUMENTS

| | | | |
|---|---|---|---|
| 2017/0199057 A1* | 7/2017 | Morita | H02K 24/00 |
| 2018/0172479 A1* | 6/2018 | Kashima | G01D 5/2046 |
| 2018/0351437 A1* | 12/2018 | Ikeda | G01D 5/2046 |
| 2020/0039579 A1 | 2/2020 | Fujita et al. | |
| 2020/0363233 A1 | 11/2020 | Ikeda et al. | |

FOREIGN PATENT DOCUMENTS

| | | |
|---|---|---|
| JP | 2010-2205 A | 1/2010 |
| JP | 2013-53890 A | 3/2013 |
| JP | 2013-247828 A | 12/2013 |
| JP | 2018-185221 A | 11/2018 |
| JP | 2020-24104 A | 2/2020 |
| WO | 2019/123592 A1 | 6/2019 |

OTHER PUBLICATIONS

Office Action dated Jun. 20, 2023 in Japanese Patent Application No. 2022-513793.

Japanese Office Action issued Oct. 10, 2023 in Application No. 2022-513793.

Office Action issued Aug. 28, 2024 in Chinese Application No. 202080099187.9.

* cited by examiner

REDUNDANT RESOLVER AND ELECTRIC POWER STEERING DEVICE EQUIPPED WITH REDUNDANT RESOLVER

This application is a National Stage of International Application No. PCT/JP2020/015954 filed Apr. 9, 2020.

TECHNICAL FIELD

The present disclosure relates to a redundant resolver and an electric power steering device mounted with the redundant resolver.

BACKGROUND ART

Among resolvers that make use of change in permeance at a gap between a rotor and a stator, multiple-system resolvers (so-called redundant resolvers) having two sets of excitation windings connected to different excitation circuits have been known.

For example, Patent Document 1 discloses a redundant resolver having two excitation windings, the redundant resolver achieving redundancy by dividing one resolver stator into a first system and a second system in a circumferential direction in order to reduce a dimension in an axial direction.

CITATION LIST

Patent Document
Patent Document 1: Japanese Patent No. 4147930
Patent Document 2: Japanese Laid-Open Patent Publication No. 2009-222435

SUMMARY OF THE INVENTION

Problems to be Solved by the Invention

However, in Patent Document 1, the number of teeth composing each of the first system and the second system is half the number of all teeth of the resolver stator. Thus, a problem arises in that the accuracy of angle detection deteriorates as compared to a single-system resolver.

In order to suppress such deterioration of the accuracy of angle detection in a redundant resolver, a configuration has been disclosed in which two resolvers are stacked in two layers in an axial-line direction, only a first output winding is wound on one of the resolvers, and only a second output winding is wound on the other resolver (see, for example, Patent Document 2).

However, in Patent Document 2, the two resolvers are stacked in two layers via a shaft, and thus a problem arises in that the dimension in the axial-line direction is twice as large as that of a single-system resolver.

The present disclosure has been made to solve the above problems, and an object of the present disclosure is to provide a redundant resolver having a high accuracy of angle detection in a main system without being upsized.

Solution to the Problems

A redundant resolver according to the present disclosure includes:
a resolver body including
  a rotor having Nx (Nx is a natural number) salient poles,
  a stator facing the rotor and having Ns (Ns is an integer equal to or larger than 3) teeth arranged in a circumferential direction, and
  an excitation winding and two phases of output windings wound on each tooth, the excitation winding and the two phases of output windings wound on each of Nsm (Nsm is an integer equal to or larger than 2) teeth among the Ns teeth being set to be of a main system, the excitation winding and the two phases of output windings wound on each of Ns-Nsm teeth being set to be of a sub-system;
an excitation circuit configured to apply voltage to the excitation winding;
a main-system computation unit configured to receive voltages of the two phases of output windings of the main system and compute an angle in the main system; and
a sub-system computation unit configured to receive voltages of the two phases of output windings of the sub-system and compute an angle in the sub-system, wherein
the number Nsm of the teeth corresponding to the main system is larger than the number Ns-Nsm of the teeth corresponding to the sub-system.

Effect of the Invention

In the redundant resolver according to the present disclosure, the number of the teeth of the stator composing the main system is set to be larger than half the number of all the teeth, and thus the redundant resolver has an improved accuracy of angle detection without being upsized.

DESCRIPTION OF EMBODIMENTS

Figure 1:
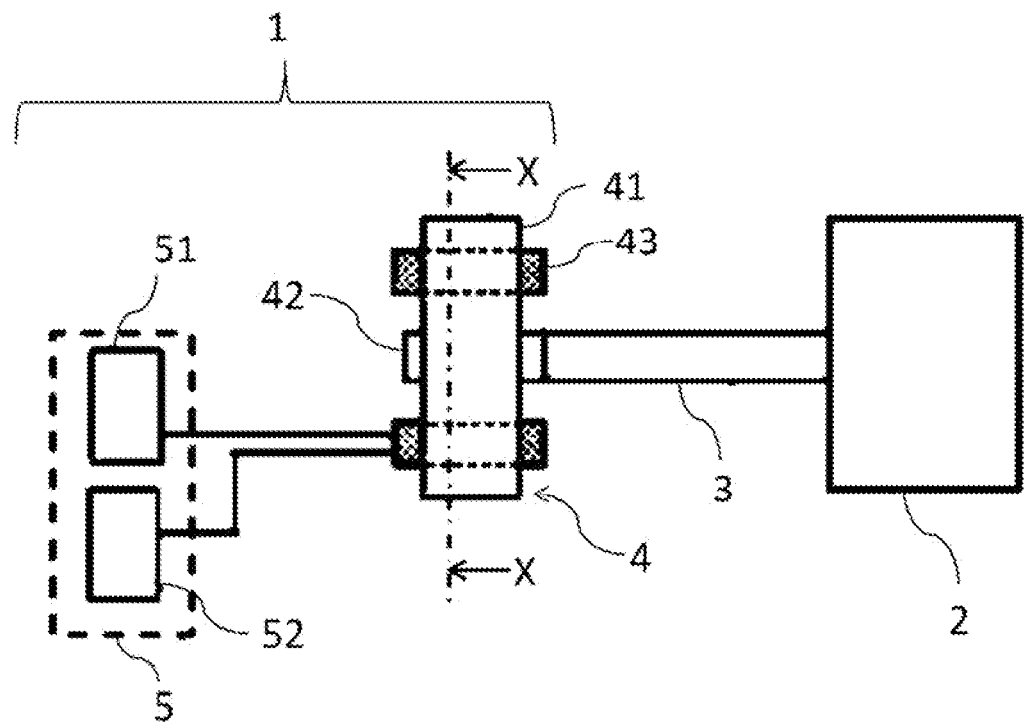
FIG. 1 is a diagram showing an example of attaching a redundant resolver according to embodiment 1 to a rotary electric machine.

Hereinafter, the present embodiments will be described with reference to the drawings. In the drawings, the same or corresponding parts are denoted by the same reference characters.

Embodiment 1

<Excitation Synchronization>

Hereinafter, a redundant resolver according to embodiment 1 will be described.

FIG. 1 is a diagram showing an example of attaching a redundant resolver 1 according to the present embodiment 1 to a rotary electric machine. It is noted that, although an example of attachment to a shaft 3 of a rotary electric machine 2 will be described, the part to which the redundant resolver 1 is to be attached is not limited to a rotary electric machine and may be another part as long as the part is a rotation shaft of a rotation portion (rotator) of any kind of device.

In FIG. 1, the redundant resolver 1 is attached to the shaft 3 which is a rotation shaft of the rotary electric machine 2. The redundant resolver 1 includes: a resolver body 4 which is a sensor; and a control circuit 5 for controlling the resolver body 4. The resolver body 4 includes a pair of members which are a stator 41 and a rotor 42, and windings 43 are wound on the stator 41. The rotor 42 is connected to a rotation portion of the rotary electric machine 2 via the shaft 3. The control circuit 5 includes: an excitation circuit 51 which applies AC voltage to each of excitation windings (described later) among the windings 43, to perform excitation; and an angle computation unit 52 which computes a rotation angle on the basis of the waveform of a signal from each of output windings (described later) among the windings 43. As described later with reference to FIG. 3, as the excitation circuit 51 and the angle computation unit 52, an excitation circuit 511 and an angle computation unit 521 are provided to a main system, and an excitation circuit 512 and an angle computation unit 522 are provided to a sub-system.

Figure 2:
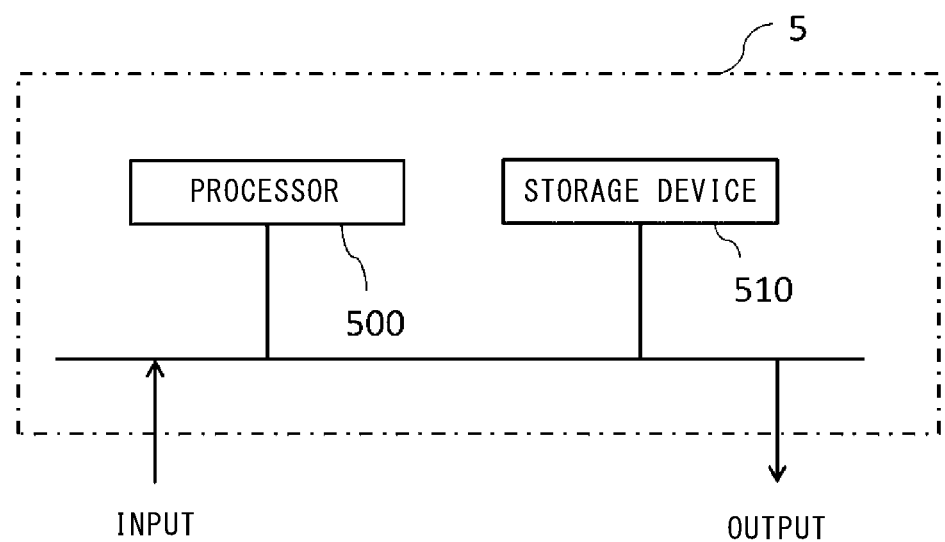
FIG. 2 is a diagram showing an example of a hardware configuration of a control circuit.

FIG. 2 shows an example of hardware implemented by a microcomputer in the control circuit 5. The hardware is composed of a processor 500 and a storage device 510. Although not shown, the storage device 510 includes a volatile storage device such as a random access memory, and a nonvolatile auxiliary storage device such as a flash memory. Alternatively, the storage device may include, as the auxiliary storage device, a hard disk instead of a flash memory. The processor 500 executes a program inputted from the storage device 510, whereby, for example, the angle calculation unit 52 computes an angle. In this case, the program is inputted from the auxiliary storage device via the volatile storage device to the processor 500. Further, the processor 500 may output data such as a computation result to the volatile storage device of the storage device 510 or may save the data via the volatile storage device into the auxiliary storage device.

It is noted that the hardware in the control circuit 5 does not have to be implemented by a microcomputer and may be implemented by an application specific integrated circuit (ASIC), a field programmable gate array (FPGA), a simple logic circuit, a relay, or the like.

Figure 3:
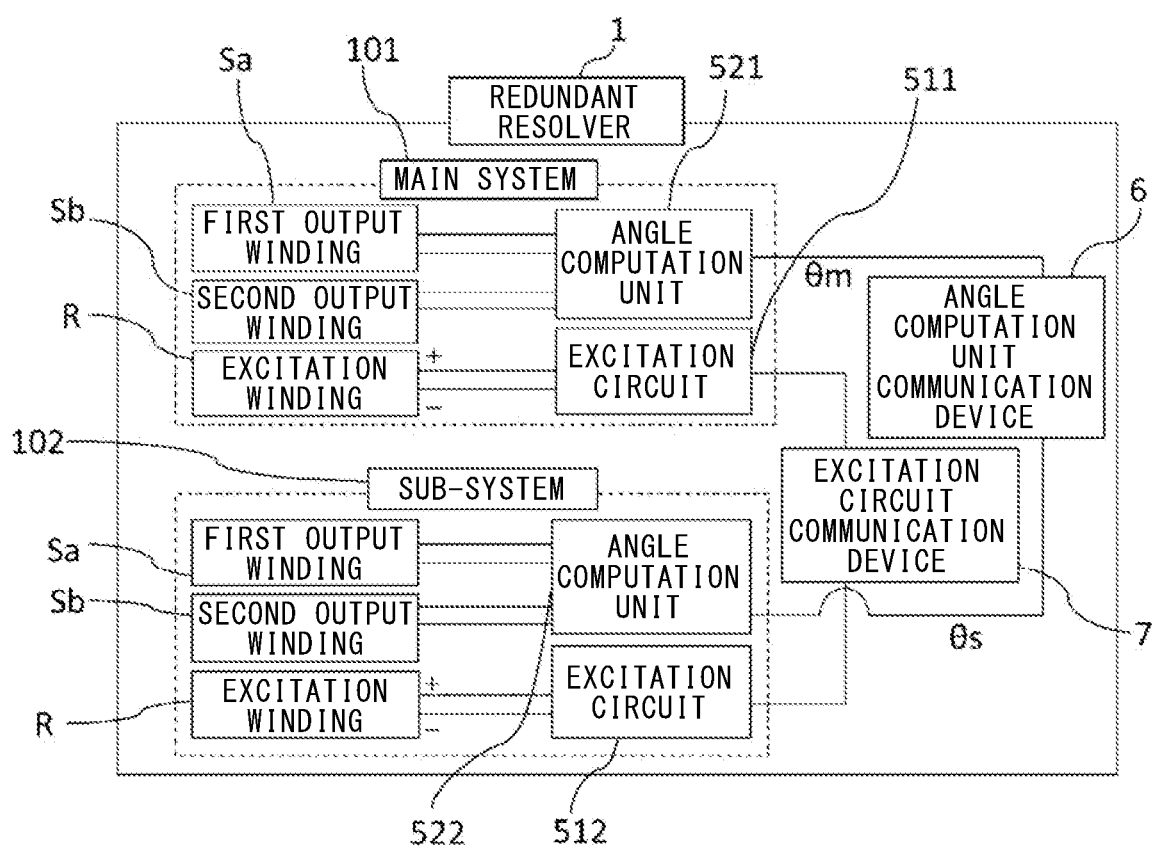
FIG. 3 is a diagram showing a configuration of the redundant resolver according to embodiment 1.

FIG. 3 is a diagram showing a configuration of the redundant resolver 1 according to the present embodiment 1. In the drawing, the redundant resolver 1 includes a resolver of a main system 101 and a resolver of a sub-system 102. Each of the resolver of the main system 101 and the resolver of the sub-system 102 has, as the windings 43, first output windings Sa, second output windings Sb, and excitation windings R. The first output windings Sa and the second output windings Sb are connected to the corresponding one of the angle computation units 521 and 522, and the excitation windings R are connected to the corresponding one of the excitation circuits 511 and 512. The angle computation unit 521 of the main system 101 and the angle computation unit 522 of the sub-system 102 are connected to each other by an angle computation unit communication device 6. The angle computation unit communication device 6 receives a main-system detection angle θm and a sub-system detection angle θs, and, if both the main system 101 and the sub-system 102 are normal, the angle computation unit communication device 6 outputs the main-system detection angle θm to, for example, a control device 13 (see FIG. 14).

With the angle computation unit communication device 6 having received the main-system detection angle θm and the sub-system detection angle θs, if the main system 101 has failed, the angle computation unit communication device 6 outputs the sub-system detection angle θs to the control device 13. Meanwhile, if the sub-system 102 has failed, the angle computation unit communication device 6 outputs the main-system detection angle θm to the control device 13. Likewise, the excitation circuit 511 of the main system 101 and the excitation circuit 512 of the sub-system 102 are connected to each other by an excitation circuit communication device 7. In the excitation circuit communication device 7, the phases of a main-system excitation signal and a sub-system excitation signal outputted from the excitation circuit 511 of the main system 101 and the excitation circuit 512 of the sub-system 102 are matched with each other so that magnetic interference between the main system 101 and the sub-system 102 is avoided. In this manner, the angle computation units 521 and 522 are provided to the respective systems, and the excitation circuits 511 and 512 are also provided to the respective systems, so that redundancy is ensured.

Figure 4:
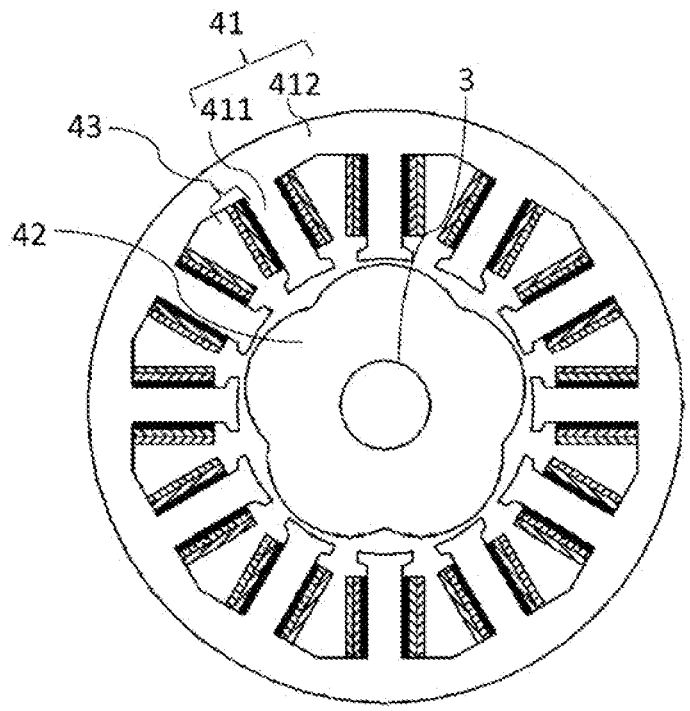
FIG. 4 is a cross-sectional view of a resolver body of the redundant resolver according to embodiment 1.

FIG. 4 is a cross-sectional view of the resolver body 4 taken at the line X-X in FIG. 1. In FIG. 4, the windings 43 are wound on respective teeth 411 of the stator 41 having a yoke 412 and the teeth 411. The rotor 42 having salient pole portions is attached to the shaft 3. In the present embodiment 1, the number Ns of the teeth 411 of the stator of the redundant resolver 1 is defined as 12, and the number Nx of the salient poles of the rotor 42 is defined as 5. The number Nx of the salient poles is also called a shaft angle multiplier.

Figure 5:
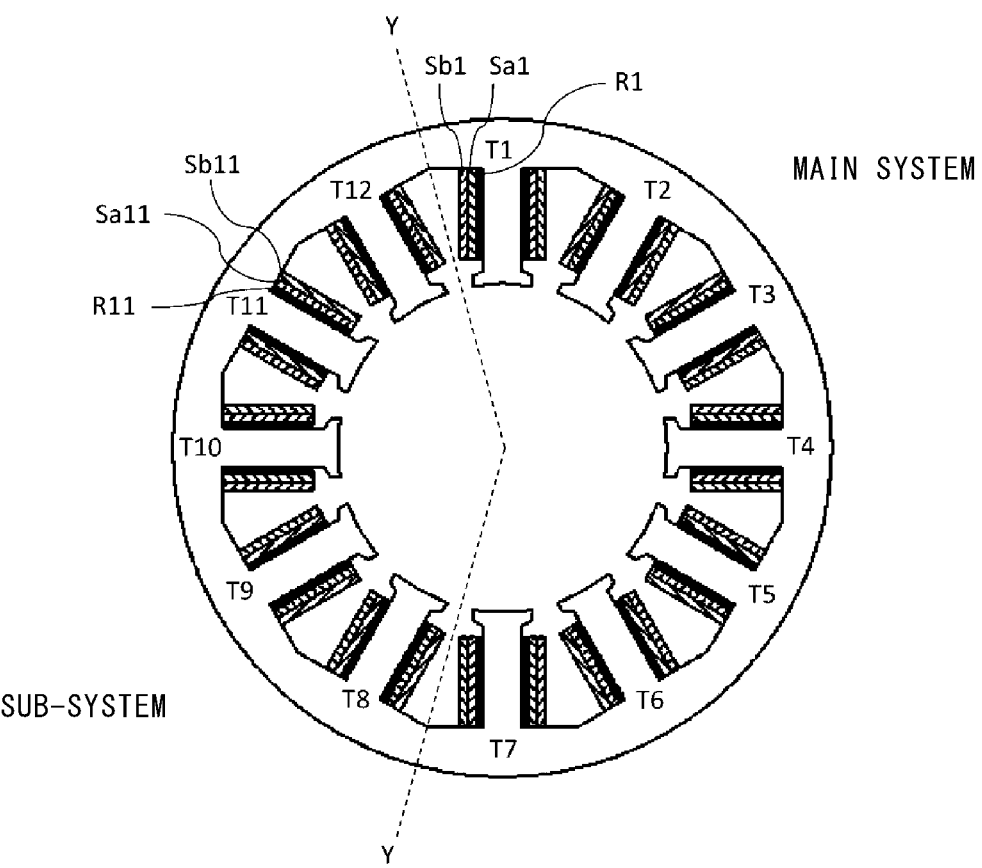
FIG. 5 is a cross-sectional view of a stator of the redundant resolver according to embodiment 1.

FIG. 5 is a diagram obtained by excluding the rotor 42 and the shaft 3 from FIG. 4, corresponds to a cross-sectional view of the stator 41, and shows a part of the configuration of the resolvers of the main system 101 and the sub-system 102. As described above, the number Ns of the teeth 411 of the stator 41 of the redundant resolver 1 is 12. In FIG. 5, if the teeth 411 are named a tooth T1 to a tooth T12 in the clockwise direction, the teeth 411 are divided by the line Y-Y in the drawing so as to be divided in the circumferential direction into two types of teeth, i.e., main-system teeth which are the tooth T1 to the tooth T7 and sub-system teeth which are the tooth T8 to the tooth T12. That is, the number of the main-system teeth is 7, and the number of the sub-system teeth is 5. Thus, in this configuration, the number of the main-system teeth is larger. The main-system teeth compose the resolver of the main system 101, and the sub-system teeth compose the resolver of the sub-system 102. Both resolvers compose the multiple-system redundant resolver 1.

Next, the windings 43 wound on the respective teeth T1 to T12 will be described.

A winding group composed of one phase of excitation winding R, and the first output winding Sa and the second output winding Sb which are two phases of output windings, is wound on each of the teeth T1 to T12. That is, excitation windings R1 to R7 of the main system 101, first output windings Sa1 to Sa7 of the main system 101, and second output windings Sb1 to Sb7 of the main system 101 are wound on the main-system teeth T1 to T7. Likewise, excitation windings R8 to R12 of the sub-system 102, first output windings Sa8 to Sa12 of the sub-system 102, and second output windings Sb8 to Sb12 of the sub-system 102 are wound on the sub-system teeth T8 to T12 (in FIG. 5, only the first output winding Sa1, the second output winding Sb1, and the excitation winding R1 on the tooth T1, and the first output winding Sa11, the second output winding Sb11, and the excitation winding R11 on the tooth T11, are shown).

The excitation windings R1 to R7 of the main system 101 and the excitation windings R8 to R12 of the sub-system 102 are connected to the excitation circuit 511 of the main system 101 and the excitation circuit 512 of the sub-system 102 via excitation terminals (not shown) provided to extending portions (not shown) of the respective resolvers.

The first output windings Sa1 to Sa7 of the main system 101 and the second output windings Sb1 to Sb7 of the main system 101 are connected to the angle computation unit 521 of the main system 101 via output terminals (not shown) provided to an extending portion of the corresponding resolver. The first output windings Sa8 to Sa12 of the sub-system 102 and the second output windings Sb8 to Sb12 of the sub-system 102 are connected to the angle computation unit 522 of the sub-system 102 via output terminals (not shown) provided to an extending portion of the corresponding resolver. The angle computation unit 521 of the main system 101 and the angle computation unit 522 of the sub-system 102 respectively calculate a main-system detection angle θm and a sub-system detection angle θs of the rotor on the basis of output signals outputted from the two phases of output windings which are the first output windings Sa and the second output windings Sb, and output the main-system detection angle θm and the sub-system detection angle θs (see FIG. 3).

In FIG. 5, if focus is placed on the tooth T1, the excitation winding R1 is wound first, and then the first output winding Sa1 and the second output winding Sb1 are wound in this order. That is, a configuration is employed in which: the excitation winding R1 is wound first; and the two phases of output windings are wound thereon. The order of winding the two phases of output windings which are the first output winding Sa1 and the second output winding Sb1 is not limited to this order, and either of the output windings may be wound first. There is a case of providing a tooth on which one of the two phases of output windings which are the first output winding Sa1 and the second output winding Sb1 is not wound. A stator core including the tooth T1 and the windings R1, Sa1, and Sb1 are insulated from each other by means of insulation paper, coating, resin, or the like (not shown). It is noted that the tooth T1 has been described, and, on the other teeth T2 to T12 as well, the excitation windings R2 to R12, the first output windings Sa2 to Sa12, and the second output windings Sb2 to Sb12 are wound in the same manner.

The excitation windings R1 to R7, the first output windings Sa1 to Sa7, and the second output windings Sb1 to Sb7 are connected in series to each other. Likewise, the excitation windings R8 to R12, the first output windings Sa8 to Sa12, and the second output windings Sb8 to Sb12 are connected in series to each other.

It is noted that, although the windings have been described here as being connected in series in the order of the teeth T1 to T7 and the teeth T8 to T12, the same advantageous effect is obtained also by making series connection in order from, as the teeth at the winding start, any teeth T1 that are adjacent to each other in the respective systems.

Further, although one phase of excitation winding R, and the first output winding Sa and the second output winding Sb which are two phases of output windings, have been described as being wound so as to be arranged in the circumferential direction, the present disclosure is not limited thereto, and the same advantageous effect can be obtained also by: arranging the windings in a radial direction; changing the order of the windings among the teeth; or the like.

Figure 6:
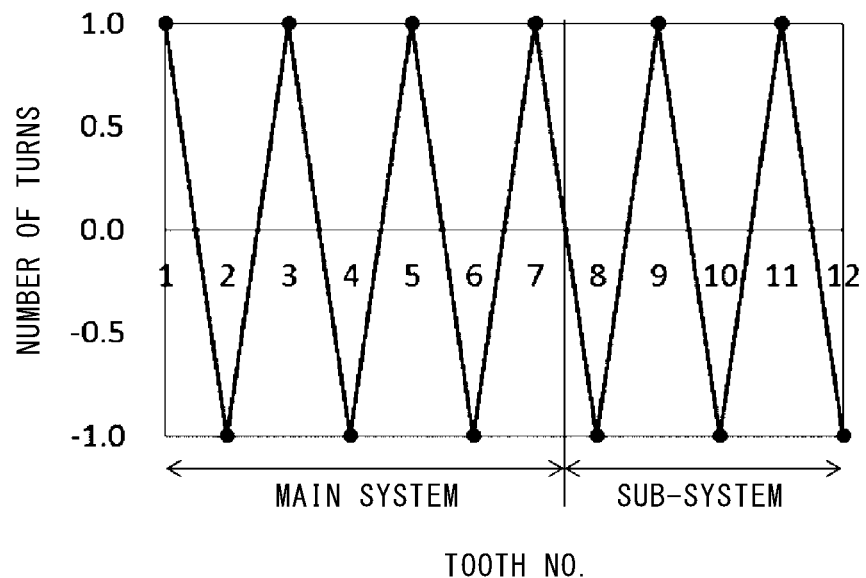
FIG. 6 is a diagram showing the numbers of turns of excitation windings in the redundant resolver according to embodiment 1.

Next, the numbers of turns of the excitation windings R1 to R7 of the main system 101 and the excitation windings R8 to R12 of the sub-system 102 in the redundant resolver according to the present embodiment 1, will be described. FIG. 6 is a diagram showing a distribution of the windings in the redundant resolver according to the present embodiment 1. In the drawing, the numbers of turns of the excitation windings are normalized with amplitude, and the numbers of turns of the excitation windings R wound on the main-system teeth T1 to T7 and the sub-system teeth T8 to T12 are continuously shown. For each of the excitation windings in the resolvers, a winding direction (+) and a winding direction (−) are defined. In the redundant resolver 1 according to the present embodiment 1, the excitation windings R are arranged such that the winding directions (+) and the winding directions (−) thereof are alternately present. The winding direction (+) and the winding direction (−) indicate the polarities, of the windings, that are different from each other. If the direction of a certain coil winding is expressed as the winding direction (+), the direction of a coil winding wound in an opposite direction is expressed as the winding direction (−). The number of turns in the winding direction (+) and the number of turns in the winding direction (−) take the same absolute value. Therefore, the spatial order Ne of the excitation windings R is 6. That is, if the number of turns in the winding direction (+) is defined as +X times, the number of turns in the winding direction (−) is −X times. It is noted that, although the windings have been described as being wound in the winding directions (+) and the winding directions (−) alternately and the spatial order of the excitation windings R has been described as being 6 here, the winding arrangement is not limited thereto, and it is possible to employ other winding arrangements such as a winding arrangement in which: the winding directions (+) and the winding directions (−) are present at every two teeth; and the spatial order of the excitation windings is 3.

Figure 7:
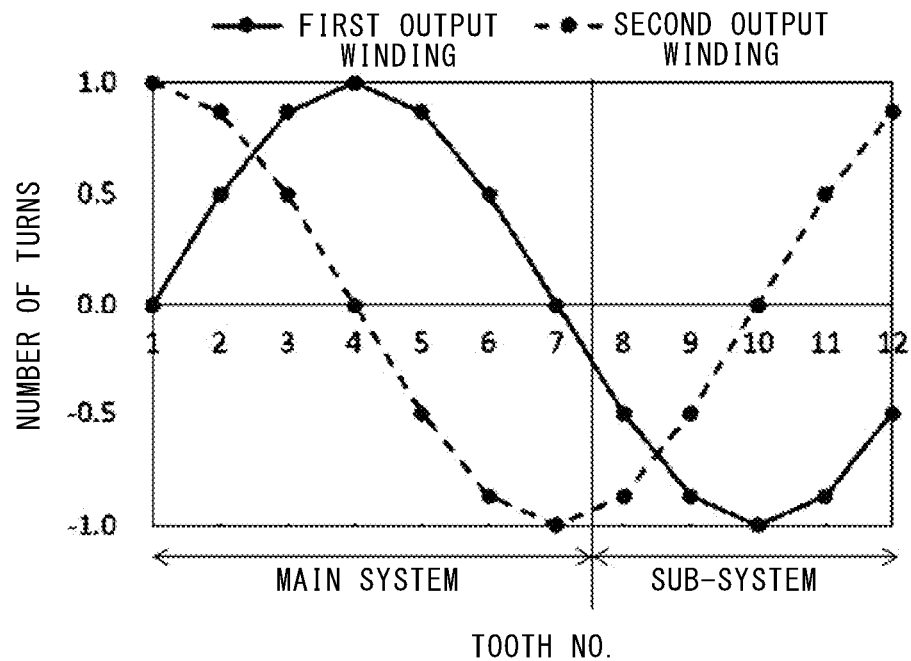
FIG. 7 is a diagram showing the numbers of turns of output windings in the redundant resolver according to embodiment 1.

FIG. 7 is a diagram showing a distribution of the numbers of turns of the first output windings Sa1 to Sa7 and the second output windings Sb1 to Sb7 of the main system 101, and the first output windings Sa8 to Sa12 and the second output windings Sb8 to Sb12 of the sub-system 102, in the redundant resolver 1 according to the present embodiment.

In the drawing, the numbers of turns of the output windings are normalized with amplitude, and the numbers of turns of the output windings wound on the main-system teeth T1 to T7 and the sub-system teeth T8 to T12 are continuously shown. The numbers $N_{Sai}$ and $N_{Sbi}$ of turns of the first output winding and the second output winding wound on an i-th tooth can be expressed according to the following expression (1), with phase difference between the windings being 90°.

[Mathematical 1]

$$N_{Sai} = N_1 \cos\left\{|N_e \pm N_x|\frac{1}{N_s}2(i-1)\pi + \theta_{teeth} + \alpha\right\} \quad \text{expression (1)}$$

$$N_{Sbi} = N_1 \cos\left\{|N_e \pm N_x|\frac{1}{N_s}2(i-1)\pi + \theta_{teeth} + \beta\right\}$$

$$|\alpha - \beta| = 90°$$

Here, $N_1$ represents the amplitude of the number of turns of each output winding, and $\theta_{teeth}$ represents the position in the circumferential direction of the tooth. Since the spatial order Ne of the excitation windings R is 6 and the shaft angle multiplier Nx is 5, the spatial order of the output windings is 1 in this case. The output windings are distributed in a sinusoidal pattern in the circumferential direction of the teeth. If the number of turns is a decimal, the decimal is rounded to the nearest whole number to obtain an integer. Here, in the drawing, the number of turns of each output winding is normalized with the amplitude of the number of turns, i.e., with $N_1$.

Figure 8:
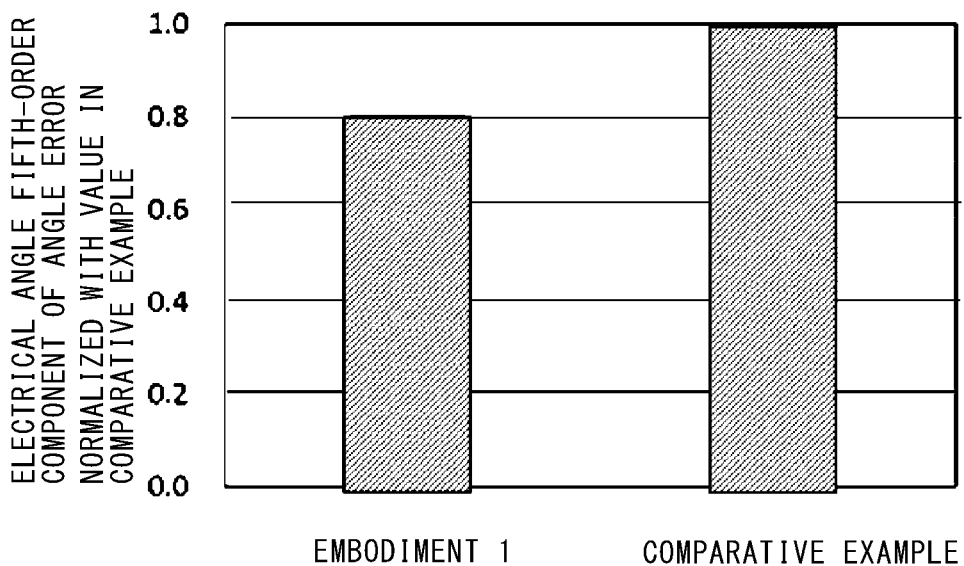
FIG. 8 is a diagram showing the accuracies of angle detection in the redundant resolver according to embodiment 1 and a comparative example.

In FIG. 8, the accuracies of angle detection in the redundant resolver 1 according to the present embodiment 1 and a comparative example, i.e., a redundant resolver in which the number of the main-system teeth is 6, are compared to each other. The vertical axis indicates electrical angle fifth-order component of angle error. The electrical angle fifth-order component is normalized with a value in the comparative example. By setting the number of the main-system teeth to be 7, the number of teeth for obtaining an output signal is increased. Thus, an advantageous effect of enabling improvement in the accuracy of angle detection in the main system 101 can be obtained.

The redundant resolver 1 according to the present embodiment 1 performs communication between the angle computation unit 521 of the main system 101 and the angle computation unit 522 of the sub-system 102 and inputs the main-system detection angle θm to the control device 13, to control the rotary electric machine 2. If the angle computation unit 521 or the angle computation unit communication device 6 detects a failure of the main system 101, the sub-system detection angle θs is inputted to the control device 13. If the angle computation unit 522 or the angle computation unit communication device 6 detects a failure of the sub-system 102, the main-system detection angle θm is inputted to the control device 13. In this manner, the redundant resolver according to the present embodiment 1 makes it possible to achieve redundancy even though the redundant resolver has a dimension equivalent to the dimension of a single-system resolver. Furthermore, the redundant resolver makes it possible to improve the accuracy of angle detection in a normal case as compared to a redundant resolver that achieves redundancy by dividing the stator into two equal parts.

Figure 9:
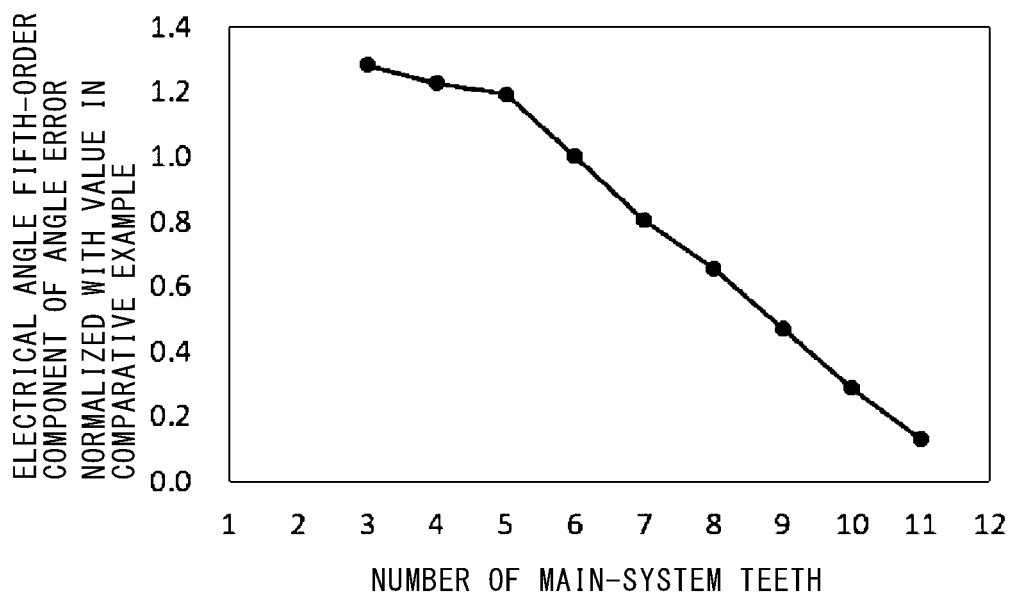
FIG. 9 is a diagram showing the relationship between the number of teeth in a main system and the accuracy of angle detection, in the redundant resolver according to embodiment 1.

FIG. 9 shows the accuracy of angle detection with the number of the main-system teeth being changed from 3 to 11. Here, the vertical axis indicates electrical angle fifth-order component of angle error. The electrical angle fifth-order component is normalized with a value in the comparative example. By setting the number of the main-system teeth to be equal to or larger than 7, i.e., to be larger than half the number of all the teeth, the accuracy of angle detection can be improved as compared to the case where the number of the main-system teeth and the number of the sub-system teeth are equal to each other.

Here, although the shaft angle multiplier Nx is set to 5 and the number Ns of the teeth is set to 12 in the redundant resolver according to the present embodiment 1, the present disclosure is not limited thereto, and the same advantageous effect can be obtained also with other numbers as long as: Nx is a natural number; and Ns is an integer equal to or larger than 3.

Embodiment 2

<Excitation Frequency Separation>

Figure 10:
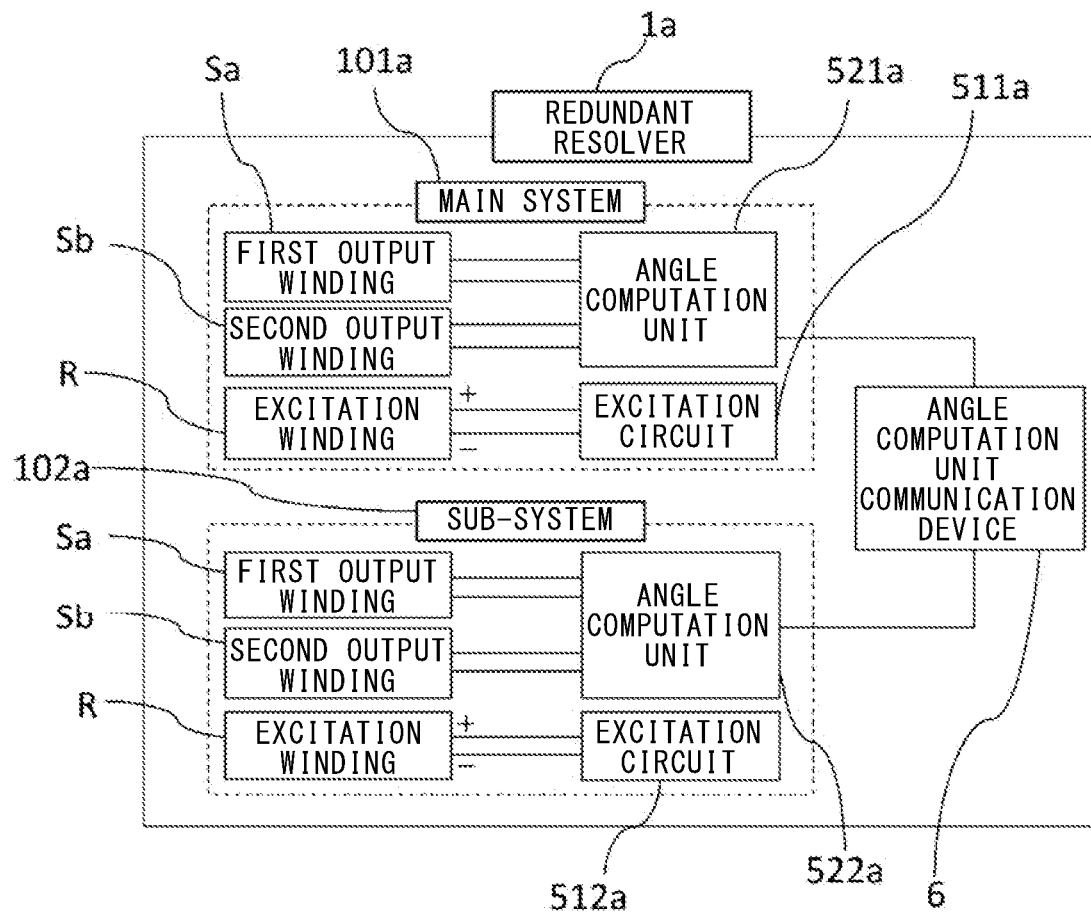
FIG. 10 is a diagram showing a configuration of a redundant resolver according to embodiment 2.

FIG. 10 is a diagram showing a configuration of a redundant resolver 1a according to the present embodiment 2. In the drawing, the redundant resolver 1a includes a resolver of a main system 101a and a resolver of a sub-system 102a. An excitation circuit 511a of the main system 101a and an excitation circuit 512a of the sub-system 102a are not connected to each other by an excitation circuit communication device and are independent of each other. With such a configuration, a common cause failure due to the excitation circuit communication device can be prevented, and thus an advantageous effect of enabling more improvement in the safety of the redundant resolver can be obtained.

As described above, in the redundant resolver 1a according to the present embodiment 2, the excitation circuit 511a which gives an excitation signal to each of the excitation windings R1 to R7 of the main system 101a, and the excitation circuit 512a which gives an excitation signal to each of the excitation windings R8 to R12 of the sub-system 102a, are independent of each other, whereby redundancy is ensured.

However, since the excitation circuits are independent of each other, it is difficult to perform synchronization between the excitation signal in the main system 101a and the excitation signal in the sub-system 102a. There is manufacturing variation between components (for example, microcomputers) of the excitation circuit 511a and the excitation circuit 512a. Thus, even if designing is performed such that the excitation signal in the main system 101a and the excitation signal in the sub-system 102a have frequencies equal to each other, the frequencies are not completely matched with each other, and a minute difference is generated therebetween. Thus, the difference between the excitation signal in the main system 101a and the excitation signal in the sub-system 102a is not fixed but changes over time. Consequently, one of the systems influences the other system. This causes deterioration of the accuracy of angle detection.

Figure 11:
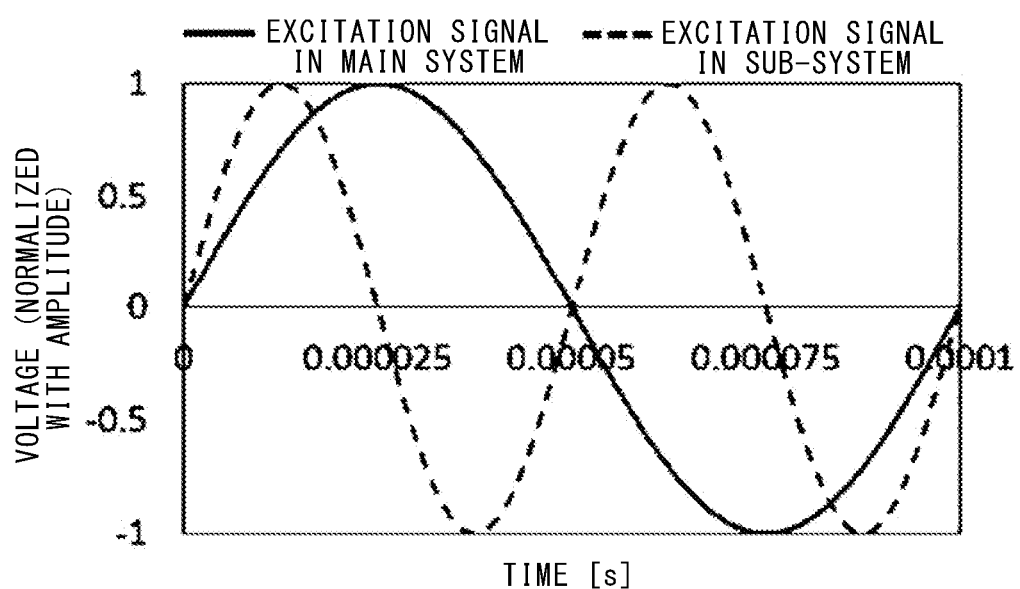
FIG. 11 is a diagram showing an excitation signal in the main system and an excitation signal in a sub-system, in the redundant resolver according to embodiment 2.

Considering this, excitation signals having different frequencies are supplied from the respective excitation circuits 511a and 512a to the corresponding excitation windings R. FIG. 11 shows an excitation signal in the main system 101a and an excitation signal in the sub-system 102a, in the redundant resolver 1 according to the present embodiment 2. A frequency f1 of the excitation signal in the main system 101a is 10 kHz, and a frequency f2 of the excitation signal in the sub-system 102a is 20 kHz. It is noted that the vertical axis indicates voltage of excitation signal. The voltage is normalized with amplitude.

Further, each of an angle computation unit 521a of the main system 101a and an angle computation unit 522a of the sub-system 102a has a function of eliminating a frequency component of the other system. That is, a component based on the excitation signal in the sub-system 102a is eliminated from each of the first output signal in the main system 101a and the second output signal in the main system 101a so that only a component based on the excitation signal in the main system 101a is extracted therefrom. Meanwhile, a component based on the excitation signal in the main system 101a is eliminated from each of the first output signal in the sub-system 102a and the second output signal in the sub-system 102a so that only a component based on the excitation signal in the sub-system 102a is extracted therefrom. Hereinafter, a method for, in one of the systems, eliminating a frequency component of the other system will be described.

Figure 12:
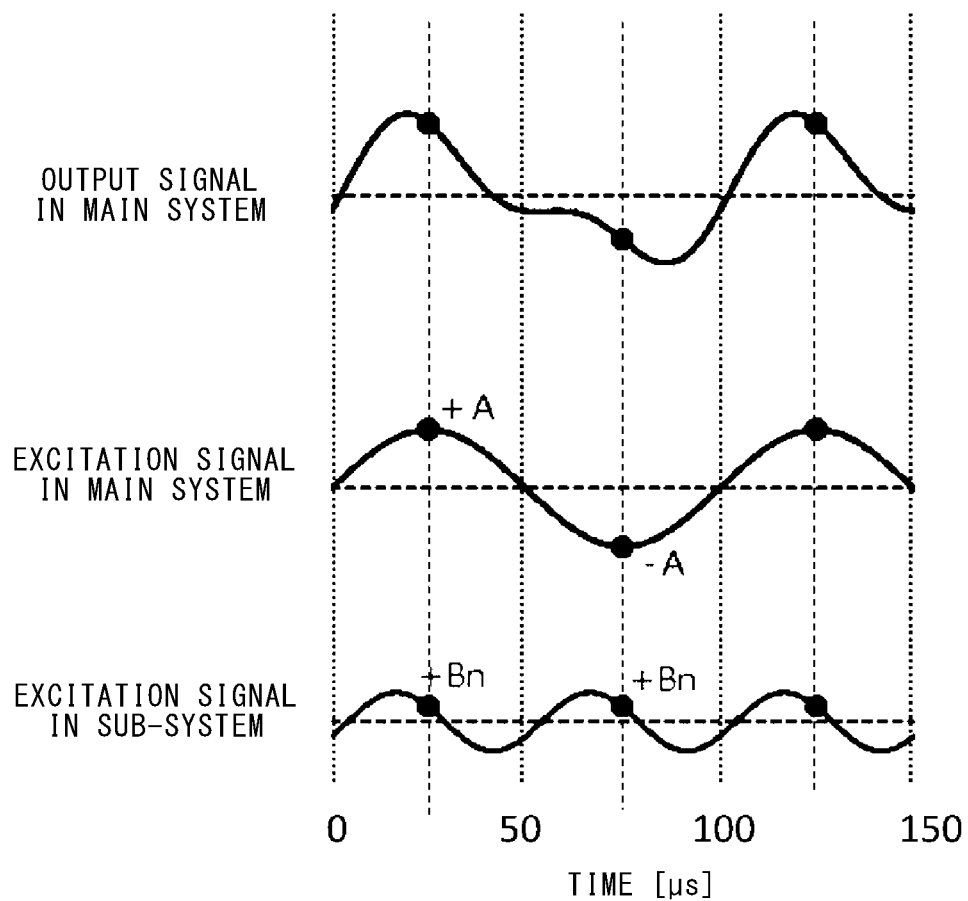
FIG. 12 is a diagram showing the waveform of an output signal in the main system in the redundant resolver according to embodiment 2.

FIG. 12 is a diagram for explaining the waveform of an output signal in the main system 101a and shows, in order from above, the waveforms of the output signal in the main system 101a, the excitation signal in the main system 101a, and the excitation signal in the sub-system 102a. The output signal in the main system 101a originally has a waveform with the frequency f1 corresponding to the excitation signal in the main system 101a. However, the output signal has a waveform in which a component having the frequency f2 of the excitation signal in the sub-system 102a has been added.

As shown in FIG. 12, +A and −A of the excitation signal in the main system 101a respectively correspond to a positive peak and a negative peak of the signal. However, it is seen that, since a component +Bn of the excitation signal in the sub-system 102a is added at each of +A and −A, the output signal in the main system 101a has a waveform resulting from distortion from the sine wave. Thus, if this output signal in the main system 101a is sampled at a cycle of 1/f1 and an arc tangent is directly computed, an error is generated owing to a component having the frequency f2 of the excitation signal in the sub-system.

Considering this, the output signal in the main system 101a is sampled at 2/f1, to obtain {(A+Bn)−(−A+Bn)}/2. Consequently, only the component A having the frequency f1 of the excitation signal in the main system 101a can be extracted so that the component Bn having the frequency f2 of the excitation signal in the sub-system 102a can be eliminated. Thus, the accuracy of rotation angle detection can be improved.

Figure 13:
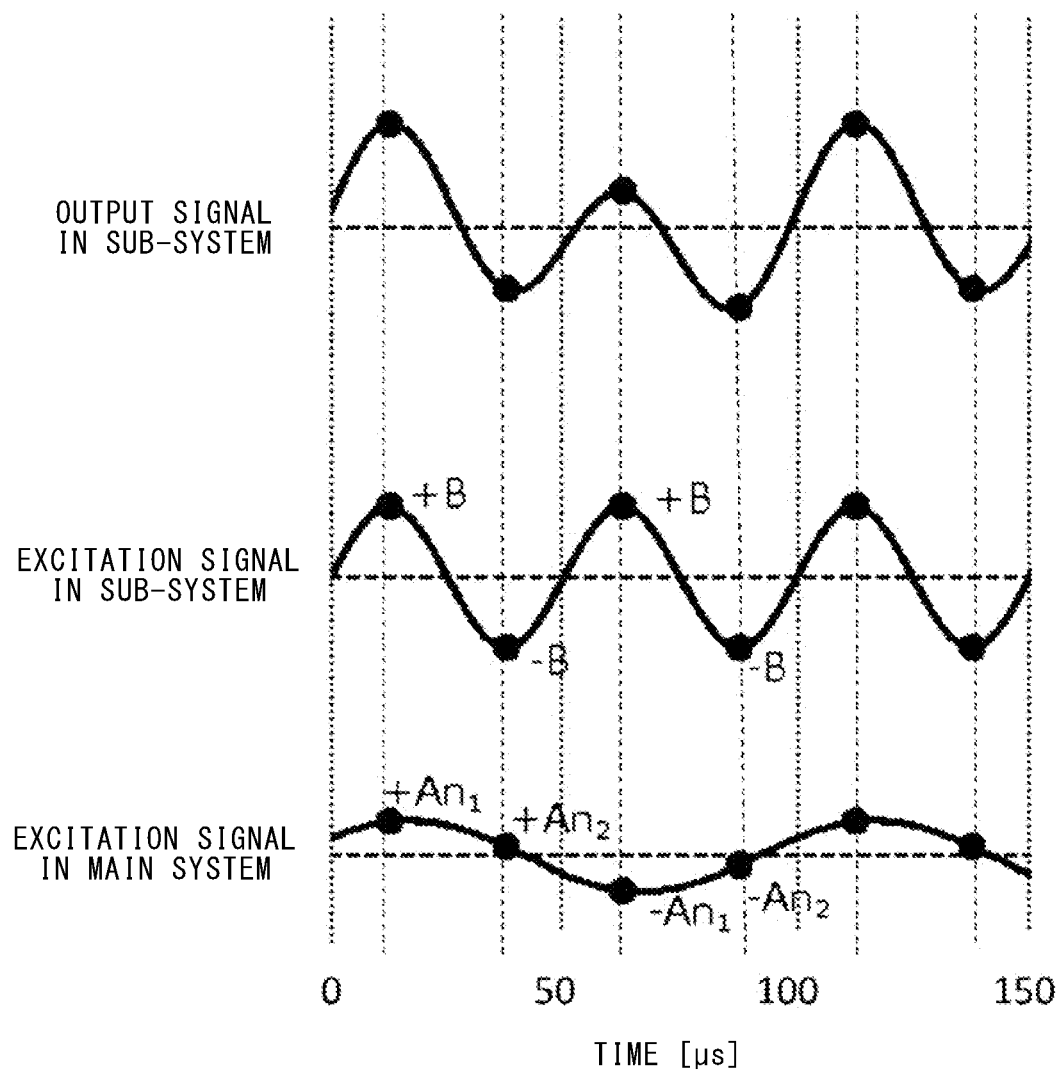
FIG. 13 is a diagram showing the waveform of an output signal in the sub-system in the redundant resolver according to embodiment 2.

FIG. 13 is a diagram for explaining the waveform of an output signal in the sub-system 102a and shows, in order from above, the waveforms of the output signal in the sub-system 102a, the excitation signal in the sub-system 102a, and the excitation signal in the main system 101a. The output signal in the sub-system 102a originally has a waveform with the frequency f2 corresponding to the excitation signal in the sub-system 102a. However, the output signal has a waveform in which a component having the frequency f1 of the excitation signal in the main system 101a has been added. As shown in the drawing, +B, −B, +B, and −B of the excitation signal in the sub-system 102a respectively correspond to a positive peak, a negative peak, a positive peak, and a negative peak of the signal. However, it is seen that, since components +An1, +An2, −An1, and −An2 of the excitation signal in the main system 101a are respectively added at +B, −B, +B, and −B, the output signal in the sub-system 102a has a waveform resulting from distortion from the sine wave. Thus, if this output signal in the sub-system 102a is sampled at a cycle of 1/f2 and an arc tangent is directly computed, an error is generated owing to a component having the frequency f1 of the excitation signal in the main system 101a.

Considering this, the output signal in the sub-system 102a is sampled at 2/f2, to obtain {(B+An1)+(B−An1)−(−B+An2)−(−B−An2)}/4. Consequently, only the component B having the frequency f2 of the excitation signal in the sub-system 102a can be extracted so that the component An having the frequency f1 of the excitation signal in the main system 101a can be eliminated. Thus, the accuracy of rotation angle detection can be improved.

In the redundant resolver according to the present embodiment 2, the main system 101a and the sub-system 102a are arranged on a stator having the shape of one circle. Further, excitation signals having frequencies that are different between the systems are supplied, and each of the angle computation units 521a and 522a eliminates influence of the excitation signal in the other system. With this feature, the main system 101a and the sub-system 102a are in a state of being independent of each other. That is, if focus is placed on the main system 101a, the main system 101a is in the same physical state as that in the case where: no excitation signal is applied to the excitation windings R of the sub-system 102a wound on the teeth of the sub-system 102a; and the sub-system 102a suffers a failure such as disconnection. In contrast, if focus is placed on the sub-system 102a, the sub-system 102a is in the same physical state as that in the case where the main system 101a suffers a failure such as disconnection. This indicates the following superiority. That is, excitation signals having frequencies different from each other are supplied from the independent excitation circuits 511a and 512a so that, in each system, a signal that does not influence the signal in the other system is obtained.

With such a configuration, a common cause failure due to the excitation circuit communication device does not occur, and thus an advantageous effect of enabling improvement in safety can be obtained. In addition, magnetic interference between the main system and the sub-system can be avoided, and thus the accuracy of angle detection can be improved.

Embodiment 3

<Mounting Redundant Resolver to Electric Power Steering>

Any of the redundant resolvers 1 described above is applicable to an electric power steering device for a vehicle.

Hereinafter, an electric power steering device according to embodiment 3 will be described with reference to FIG. 14.

Figure 14:
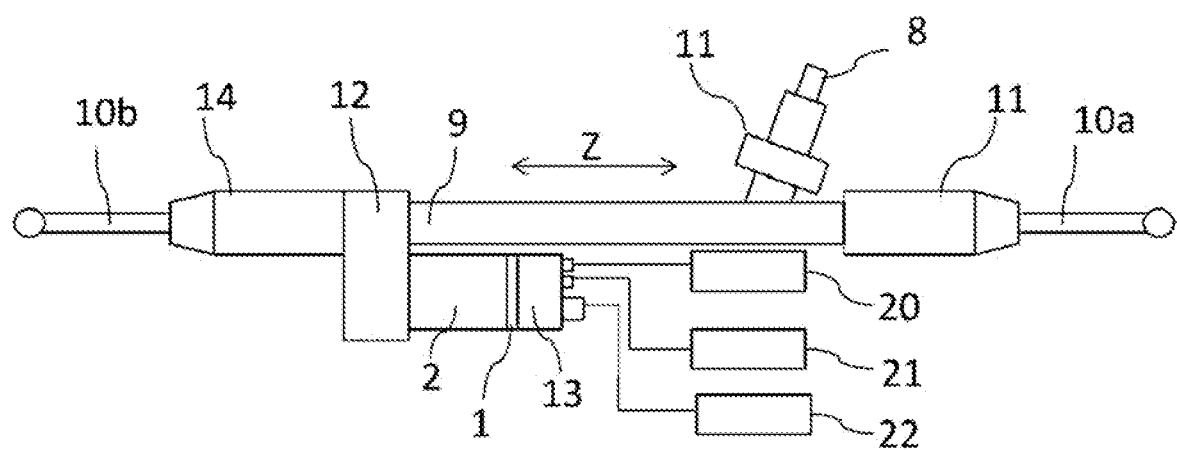
FIG. 14 is a schematic configuration diagram of an electric power steering device according to embodiment 3.

FIG. 14 is a schematic configuration diagram of the electric power steering device mounted in a vehicle such as an automobile. In FIG. 14, a steering wheel (not shown) to be steered by a driver is connected to one end of a shaft 8. Thus, when a driver steers the steering wheel, the torque thereof is transmitted to the shaft 8. The shaft 8 is connected to a rack shaft (not shown) inside a housing 9. A front right wheel tie rod 10a and a front left wheel tie rod 10b are respectively connected to both ends of the rack shaft, a right wheel (not shown) is connected via a knuckle arm (not shown) to the front right wheel tie rod 10a, and a left wheel (not shown) is connected via a knuckle arm (not shown) to the front left wheel tie rod 10b. The left and right front wheels are oriented according to steering of the steering wheel by the driver. It is noted that a rack boot 14 is provided such that no foreign object enters the device.

The electric power steering device assists a driver in steering of the steering wheel. When the driver steers the steering wheel to generate a steering torque, this assist is performed by generating a supplementary torque that supplements the steering torque. As described with reference to FIG. 1, this supplementary torque is generated with the rotary electric machine 2, which is a permanent magnet type rotary electric machine, serving as a power source. When the driver steers the steering wheel, a torque is detected by a torque sensor 11 attached to the shaft 8. The detected torque is transmitted to a main-system power supply source 20 and a sub-system power supply source 21. In addition, information about the vehicle such as a vehicle speed is also converted into an electrical signal, and the electrical signal is transmitted to the main-system power supply source 20 and the sub-system power supply source 21. Each of the main-system power supply source 20 and the sub-system power supply source 21 computes a required assist torque on the basis of the detected torque and the information about the vehicle such as the vehicle speed, and supplies current to the rotary electric machine 2 via the control device 13 (inverter or the like) for the rotary electric machine. To the control device 13, power is supplied from a power supply 22 via a power supply connector. As described with reference to FIG. 1, the redundant resolver 1 is attached to the shaft 3 of the rotary electric machine 2. The redundant resolver 1 detects a rotation angle of a rotor of the rotary electric machine 2 and outputs a rotation angle signal corresponding to the rotation angle. It is noted that the control device 13 may have the hardware configuration shown in FIG. 2 in the same manner as the control circuit 5.

The rotary electric machine 2 is disposed so as to be oriented parallelly to a movement direction (arrow Z) of the rack shaft. A torque generated by the rotary electric machine 2 is transmitted to a belt and a ball screw inside a gearbox 12, and thrust force for moving the rack shaft inside a housing 9 in a direction indicated by the arrow Z is generated. The thrust force provides assist for the steering force of the driver. The front right wheel tie rod 10a and the front left wheel tie rod 10b are operated by the thrust force of the rotary electric machine 2 and the steering force of the driver. Thus, the orientations of both wheels are changed, whereby the vehicle can be turned.

In this manner, owing to the assist by the torque from the rotary electric machine 2, the driver can turn the vehicle with a small amount of steering force. In the electric power steering device according to the present embodiment, the redundant resolver 1 according to the above embodiment 1 or 2 has been applied for detecting a rotation angle of the rotary electric machine 2. In the electric power steering device, cogging torque and torque ripple generated by the rotary electric machine 2 are transmitted via a gear to the driver. Thus, cogging torque and torque ripple are desirably reduced in order to obtain favorable steering feeling. In addition, vibrations and noise at the time of operation of the rotary electric machine 2 are also desirably reduced.

To this end, the rotation angle of the rotary electric machine 2 is detected with high accuracy. Consequently, the rotary electric machine can be smoothly controlled. Thus, generation of torque ripple can be suppressed as compared to the case where the accuracy of rotation angle detection is low. The same applies also to vibrations and noise. Therefore, the electric power steering device in which the rotary electric machine 2 is mounted with the redundant resolver 1 according to the above embodiment 1 or 2 can provide favorable steering feeling to the driver.

Further, even if one of the systems has failed, the redundant resolver 1 according to embodiment 1 or 2 can detect a rotation angle with high accuracy in the other system. Thus, the redundant resolver 1 can continuously output assist force. It is noted that, although the redundant resolver 1 is shown as being attached to the rotary electric machine in FIG. 1, it is needless to say that: a body of the redundant resolver 1 can be attached inside the rotary electric machine; and the control circuit 5 can be provided outside of the rotary electric machine 2.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the specification of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 redundant resolver
2 rotary electric machine
3 shaft
4 resolver body
5 control circuit
6 angle computation unit communication device
7 excitation circuit communication device
101, 101a main system
102, 102a sub-system
511, 511a, 512, 512a excitation circuit
521, 521a, 522, 522a angle computation unit

The invention claimed is:
1. A redundant resolver comprising:
a resolver body including
a rotor having Nx (Nx is a natural number) salient poles,
a stator facing the rotor and having Ns (Ns is an integer equal to or larger than 3) teeth arranged in a circumferential direction, and
an excitation winding and two phases of output windings wound on each tooth, the excitation winding and the two phases of output windings wound on each of Nsm (Nsm is an integer equal to or larger than 2) teeth among the Ns teeth being set to be of a main system, the excitation winding and the two phases of output windings wound on each of Ns-Nsm teeth being set to be of a sub-system;
an excitation circuit configured to apply voltage to the excitation winding;
a main-system angle computer to receive voltages of the two phases of output windings of the main system and compute an angle in the main system; and
a sub-system angle computer to receive voltages of the two phases of output windings of the sub-system and compute an angle in the sub-system, wherein the number Nsm of the teeth corresponding to the main system is larger than the number Ns-Nsm of the teeth corresponding to the sub-system.

2. The redundant resolver according to claim 1, wherein the main-system angle computer and the sub-system angle computer are connected to an angle computer communication device.

3. The redundant resolver according to claim 2, wherein the excitation circuit is composed of
a main-system excitation circuit configured to apply voltage to the excitation winding corresponding to the main system, and
a sub-system excitation circuit configured to apply voltage to the excitation winding corresponding to the sub-system.

4. The redundant resolver according to claim 3, wherein the main-system excitation circuit and the sub-system excitation circuit are connected to an excitation circuit communication device.

5. The redundant resolver according to claim 3, wherein a main-system excitation frequency of AC voltage applied to the excitation winding by the main-system excitation circuit, and a sub-system excitation frequency of AC voltage applied to the excitation winding by the sub-system excitation circuit, are different from each other.

6. The redundant resolver according to claim 5, wherein, with use of the main-system excitation frequency and the sub-system excitation frequency, the main-system angle computer eliminates an excitation signal component in the sub-system, and the sub-system angle computer eliminates an excitation signal component in the main system.

7. An electric power steering device comprising the redundant resolver according to claim 2.

8. The redundant resolver according to claim 1, wherein the excitation circuit is composed of
a main-system excitation circuit configured to apply voltage to the excitation winding corresponding to the main system, and
a sub-system excitation circuit configured to apply voltage to the excitation winding corresponding to the sub-system.

9. The redundant resolver according to claim 8, wherein the main-system excitation circuit and the sub-system excitation circuit are connected to an excitation circuit communication device.

10. An electric power steering device comprising the redundant resolver according to claim 9.

11. The redundant resolver according to claim 8, wherein a main-system excitation frequency of AC voltage applied to the excitation winding by the main-system excitation circuit, and a sub-system excitation frequency of AC voltage applied to the excitation winding by the sub-system excitation circuit, are different from each other.

12. The redundant resolver according to claim 11, wherein, with use of the main-system excitation frequency and the sub-system excitation frequency, the main-system angle computer eliminates an excitation signal component in the sub-system, and the sub-system angle computer eliminates an excitation signal component in the main system.

13. An electric power steering device comprising the redundant resolver according to claim 12.

14. An electric power steering device comprising the redundant resolver according to claim 11.

15. An electric power steering device comprising the redundant resolver according to claim 8.

16. An electric power steering device comprising the redundant resolver according to claim 1.

* * * * *